US012633232B2

(12) United States Patent  
Park et al.

(10) Patent No.: US 12,633,232 B2  
(45) Date of Patent: May 19, 2026

(54) DEEP LEARNING-BASED PEDAGOGICAL WORD RECOMMENDATION METHOD FOR PREDICTING AND IMPROVING VOCABULARY SKILLS OF FOREIGN LANGUAGE LEARNERS

(71) Applicant: Socra AI Inc., Seoul (KR)

(72) Inventors: June Young Park, Yongin-si (KR); Jae Min Shin, Seoul (KR)

(73) Assignee: Socra AI Inc., Seoul (KR)

( * ) Notice: Subject to any disclaimer, the term of this patent is extended or adjusted under 35 U.S.C. 154(b) by 973 days.

(21) Appl. No.: 17/845,315

(22) Filed: Jun. 21, 2022

(65) Prior Publication Data

US 2022/0406216 A1 Dec. 22, 2022

(30) Foreign Application Priority Data

Jun. 21, 2021 (KR) ........................ 10-2021-0080065  
Mar. 14, 2022 (KR) ........................ 10-2022-0031245

(51) Int. Cl.  
*G09B 19/06* (2006.01)  
*G06F 3/04845* (2022.01)  
*G09B 5/02* (2006.01)

(52) U.S. Cl.  
CPC ............... *G09B 19/06* (2013.01); *G09B 5/02* (2013.01); *G06F 3/04845* (2013.01)

(58) Field of Classification Search  
CPC ....... G09B 19/06; G09B 5/02; G06F 3/04845; G06F 3/0482; G06F 3/04883;  
(Continued)

(56) References Cited

U.S. PATENT DOCUMENTS

| | | | | |
|---|---|---|---|---|
| 10,564,792 B2 * | 2/2020 | Kim | ...................... | G06F 3/0488 |
| 2022/0121826 A1 * | 4/2022 | Ma | ......................... | G06N 3/045 |
| 2022/0406217 A1 * | 12/2022 | Park | ....................... | G06F 18/22 |

FOREIGN PATENT DOCUMENTS

| | | | | | |
|---|---|---|---|---|---|
| CN | 107346183 B | * | 2/2021 | ........... | G06F 3/0237 |
| CN | 109271636 B | * | 8/2023 | ........... | G06F 40/289 |

(Continued)

OTHER PUBLICATIONS

CN107346183B Translation (Year: 2017).*  
CN109271636B Translation (Year: 2018).*

*Primary Examiner* — Peter S Vasat  
*Assistant Examiner* — Selwa A Alsomairy  
(74) *Attorney, Agent, or Firm* — USX IP LLC

(57) ABSTRACT

According to an aspect of the present specification, a method in which a terminal recommends a word to a user includes: receiving recommended word information from a server, wherein the recommended word information includes word information that the user is predicted not to know in an AI (Artificial Intelligence) model of the user on the basis of training data of the user; displaying a first window including the word information on the basis of the recommended word information; receiving operation of dragging the first window from the user; displaying an icon representing whether to add the word information to a vocabulary list of the terminal on the basis of a direction of the dragging operation; and including the word information in the vocabulary on the basis of the direction of the dragging operation.

12 Claims, 10 Drawing Sheets

(58) Field of Classification Search
CPC ............. G06F 3/04886; G06F 3/04895; G06F
3/04817; G06F 3/0488; G06Q 50/2057;
G06N 3/08
See application file for complete search history.

(56) References Cited

FOREIGN PATENT DOCUMENTS

| KR | 10-2017-0080519 A | 7/2017 |
| KR | 10-2019-0082453 A | 7/2019 |
| KR | 10-2213476 B1 | 2/2021 |
| KR | 10-2021-0057954 A | 5/2021 |

* cited by examiner

DEEP LEARNING-BASED PEDAGOGICAL WORD RECOMMENDATION METHOD FOR PREDICTING AND IMPROVING VOCABULARY SKILLS OF FOREIGN LANGUAGE LEARNERS

BACKGROUND OF THE INVENTION

Field of the Invention

The present specification relates to a method in which a terminal recommends a word for improving vocabulary skills of foreign language learners through deep learning, and an apparatus for the method.

Description of the Related Art

In studying a second foreign language, in order to learn a word or memorize a word, the most important point for a user is to find a way for the user to memorize a vocabulary effectively.

For example, the problems students often face may be the followings. First, a user may need to manually enter unknown words into an app (or write on paper) to make and use flashcards. Second, it is difficult to implement a system that automatically recommends an interface using a word or algorithm that the user does not know.

However, in the existing academia or industry, there has not been much effort to alleviate such burden of users by using artificial intelligence (AI).

SUMMARY OF THE INVENTION

An object of the present specification is to provide a method for increasing efficiency and effectiveness of word memorization of foreign language learners.

In addition, an object of the present specification is to provide a method for recommending an accurate word to foreign language learners by a trained AI model through knowledge tracking of foreign language learners.

In addition, an object of the present specification is to provide a user interface through which a user can study and memorize a word more efficiently.

In addition, an object of the present specification is to provide a method of collecting data about word selection of a user to train an AI model through a user interface.

The technical problems to be achieved by the present specification are not limited to the technical problems mentioned above, and other technical problems not mentioned may be clear to those of ordinary skill in the art to which the present specification belongs from the detailed description of the following specification.

An aspect of the present specification, there is provided a word recommendation method in which a terminal recommends a word to a user, including: a step of receiving recommended word information from a server, wherein the recommended word information includes word information that the user is predicted not to know in an AI (Artificial Intelligence) model of the user on the basis of training data of the user; a step of displaying a first window including the word information on the basis of the recommended word information; a step of receiving operation of dragging the first window from the user; a step of displaying an icon representing whether to add the word information to a vocabulary list of the terminal on the basis of a direction of the dragging operation; and a step of including the word information in the vocabulary list on the basis of the direction of the dragging operation.

In addition, the word recommendation method may further include a step of updating the training data on the basis of the vocabulary list and transmitting the training data to the server.

In addition, the word information may be included in the vocabulary list when the direction of the dragging operation is a first direct, and the word information may not be included in the vocabulary list when the direction of the dragging operation is a direction opposite to the first direction.

In addition, in the step of displaying the icon, the word information may be moved in the direction of the dragging operation in response to the dragging operation, and movement of the icon may be displayed in accordance with movement of the word information.

In addition, the word recommendation method may further include a step of displaying a second window including the word information of the vocabulary list on the basis of the vocabulary list; and a step of receiving touch operation of the second window for checking meaning of a word of the word information on the basis of the word information from the user.

In addition, a third window for presenting meaning of the word information of the vocabulary list may be displayed on the basis of a point of receiving the touch operation.

In addition, the step of displaying the third window may be to rotate and display the second window in a direction corresponding to the point of receiving the touch operation.

In addition, the AI model may include (1) a user embedding model for generating an embedding vector of the user, and (2) a word embedding model for generating an embedding vector of a word related to the word information.

According to an another aspect of the present specification, there is provided a terminal which recommends a word to a user, including: a communication module; a memory; a display unit; and a processor, wherein the processor receives recommended word information from a server through the communication module, the recommended word information includes word information that the user is predicted not to know in an AI (Artificial Intelligence) model on the basis of training data of the user, and the processor allows the display unit to display a first window including the word information on the basis of the recommended word information, to receive operation of dragging the first window from the user, and to display an icon representing whether to add the word information to a vocabulary list included in the memory on the basis of a direction of the dragging operation, and includes the word information in the vocabulary list on the basis of a direction of the dragging operation.

Figure 1:
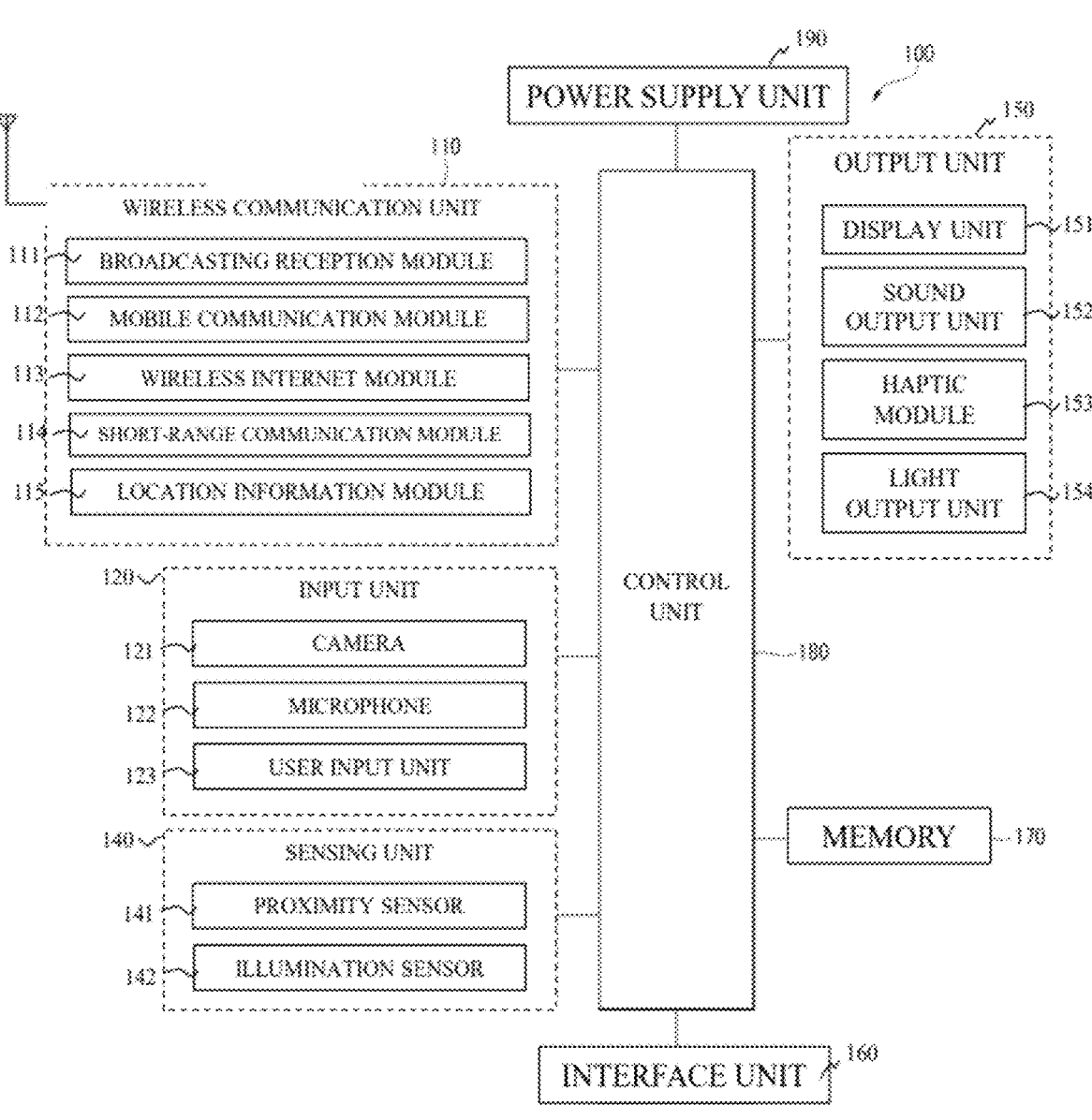
FIG. 1 is a block diagram illustrating an electronic apparatus related to the present specification.

The accompanying drawings, which are included as a part of the detailed description to help the understanding of the present specification, provide embodiments of the present specification, and together with the detailed description, explain the technical features of the present specification.

DETAILED DESCRIPTION OF THE PREFERRED EMBODIMENTS

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical idea disclosed in the present specification is not limited by the accompanying drawings, and should be understood to include all changes, equivalents, or substitutes included in the spirit and scope of the present specification.

Terms including an ordinal number, such as first, second, etc., may be used to describe various components, but the components are not limited by the terms. The above terms are used only for the purpose of distinguishing one component from another.

When a certain component is referred to as being "connected" or "linked" to another component, it may be directly connected or linked to the other component, but it should be understood that other components may exist in between. On the other hand, when it is mentioned that a certain component is "directly connected" or "directly linked" to another component, it should be understood that no other component exists in between.

The singular expression includes the plural expression unless the context clearly dictates otherwise.

In the present application, terms such as "include" or "have" are intended to designate that the features, numbers, steps, operations, components, parts, or combinations thereof described in the specification exist, and it should be understood that the possibility of presence or addition of one or more other features, numbers, steps, operations, components, parts, or combinations thereof is not excluded.

FIG. 1 is a block diagram illustrating an electronic apparatus according to the present specification.

The electronic apparatus 100 may include a wireless communication unit 110, an input unit 120, a sensing unit 140, an output unit 150, an interface unit 160, a memory 170, a control unit 180, a power supply unit 190, and the like. The components illustrated in FIG. 1 are not essential in implementing the electronic apparatus, and the electronic apparatus described in the present specification may have more or fewer components than the components listed above.

More specifically, the wireless communication unit 110 of the components may include one or more modules which enable wireless communication between the electronic apparatus 100 and a wireless communication system, between the electronic apparatus 100 and another electronic apparatus 100, or between the electronic apparatus 100 and an external server. In addition, the wireless communication unit 110 may include one or more modules which connect the electronic apparatus 100 to one or more networks.

Such a wireless communication unit 110 may include at least one of a broadcasting reception module 111, a mobile communication module 112, a wireless internet module 113, a short-range communication module 114, and a location information module 115.

The input unit 120 may include a camera 121 or an image input unit for inputting an image signal, a microphone 122 or an audio input unit for inputting an audio signal, and a user input unit 123 (e.g., touch key, push key (mechanical key), etc.) for receiving information from a user. Voice data or image data collected by the input unit 120 may be analyzed and processed by a control command of a user.

The sensing unit 140 may include one or more sensors for sensing at least one of information in the electronic apparatus, surrounding environment information around the electronic apparatus, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared sensor (IR sensor), a finger scan sensor, an ultrasonic sensor, an optical sensor (e.g., camera 121), a microphone 122, a battery gauge, an environment sensor (e.g., barometer, hygrometer, thermometer, radiation detection sensor, heat detection sensor, and gas detection sensor), and a chemical sensor (e.g., electronic nose, healthcare sensor, and biometric sensor). Meanwhile, the electronic apparatus disclosed in the present specification may utilize combination of information sensed by at least two sensors of such sensors.

The output unit 150 is to generate an output related to sight, hearing, touch, or the like, and may include at least one of a display unit 151, a sound output unit 152, a haptic module 153, and a light output unit 154. The display unit 151 has an inter-layer structure with a touch sensor or is formed integrally, thereby implementing a touch screen. Such a touch screen may serve as a user input unit 123 providing an input interface between the electronic apparatus 100 and a user, and may provide an output interface between the electronic apparatus 100 and the user.

The interface unit 160 serves as a passage with various kinds of external apparatus connected to the electronic apparatus 100. Such an interface unit 160 may include at least one of a wired/wireless headset port, an external charger port, a wired/wireless data port, a memory card port, a port connecting a device provided with an identification module, an audio I/O (Input/Output) port, a video I/O (Input/Output) port, and an earphone port. The electronic apparatus 100 may perform a proper control related to a connected external apparatus in response to connecting an external apparatus to the interface unit 160.

In addition, the memory 170 stores data supporting various functions of the electronic apparatus 100. The memory 170 may store a number of programs (application program or application) running in the electronic apparatus 100, data for operation of the electronic apparatus 100, and commands. At least a part of such application programs may be downloaded from an external server through wireless communication. In addition, at least a part of such application programs may exist on the electronic apparatus 100 from the time of shipment for basic functions (e.g., call receiving and sending functions, and message receiving and sending functions) of the electronic apparatus 100. Meanwhile, the application programs may be stored in the memory 170, installed on the electronic apparatus 100, and driven to perform operations (or functions) of the electronic apparatus by the control unit 180.

In addition to the operations related to the application programs, the control unit 180 generally controls overall operations of the electronic apparatus 100. The control unit 180 may provide or process appropriate information or functions to a user by processing signals, data, information, and the like input or output through the components described above or running the application programs stored in the memory 170.

In addition, the control unit 180 may control at least a part of the components described with reference to FIG. 1 to run the application programs stored in the memory 170. Furthermore, in order to run the application programs, the control unit 180 may operate at least two components included in the electronic apparatus 100 in combination with each other.

The power supply unit 190 receives external power and internal power, and supplies power to each component included in the electronic apparatus 100 under the control of the control unit 180. Such a power supply unit 190 may include a battery, and the battery may be a built-in battery or a replaceable battery.

At least a part of the components may be operated cooperatively with each other to implement an operation, control, or control method of the electronic apparatus according to various embodiments described hereinafter. In addition, the operation, control, or control method of the electronic apparatus may be implemented on the electronic apparatus by running at least one application program stored in the memory 170.

In the present specification, the electronic apparatus 100 may be collectively referred to as a terminal.

Figure 2:
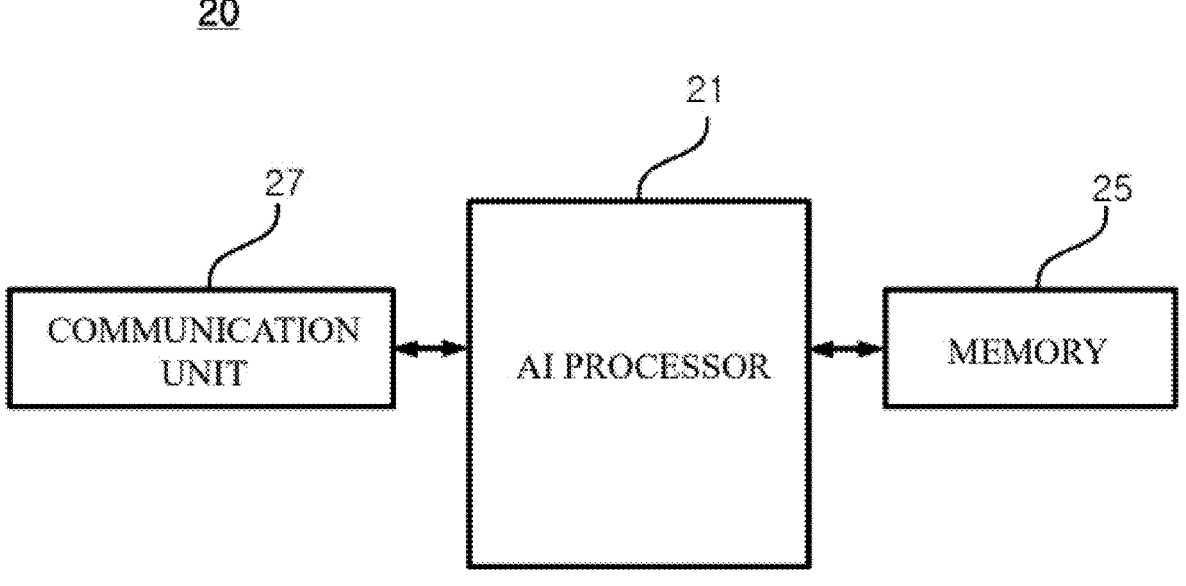
FIG. 2 is a block diagram illustrating an AI device according to an embodiment of the present specification.

FIG. 2 is a block diagram illustrating an AI device according to an embodiment of the present specification.

The AI device 20 may include an electronic apparatus including an AI module capable of AI processing or a server including the AI module. In addition, the AI device 20 may be included as at least a part of the composition of the electronic apparatus 100 illustrated in FIG. 1, and perform at least a part of the AI processing together.

The AI device 20 may include an AI processor 21, a memory 25, and/or a communication unit 27.

The AI device 20 may be implemented by various electronic device such as a server, a desktop PC, a laptop PC, and a tablet PC, as a computing device capable of learning a neural network.

The AI processor 21 may learn an AI model by using a program stored in the memory 25. Particularly, the AI processor 21 may learn the AI model to recognize data for word learning.

Meanwhile, the AI processor 21 performing the functions described above may be a general purpose processor (e.g., CPU), but may be an AI dedicated processor (e.g., GPU) for artificial intelligence learning.

The memory 25 may store various kinds of programs and data necessary for operation of the AI device 20. The memory 25 may be implemented by a non-volatile memory, a volatile memory, a flash memory, a hard disk drive (HDD), a solid state drive (SSD), and the like. The memory 25 may be accessed by the AI processor 21, and the AI processor 21 may perform reading, recording, modifying, deleting, updating, and the like of data. In addition, the memory 25 may store a neural network model (e.g., deep learning model) generated through a learning algorithm for data classification/recognition according to an embodiment of the present specification.

Meanwhile, the AI processor 21 may include a data learning unit which learns a neural network for data classification/recognition. For example, the data learning unit may acquire training data to be used for learning, and apply the acquired training data to a deep learning model, thereby training the deep learning model.

The communication unit 27 may transmit an AI processing result of the AI processor 21 to an external electronic apparatus.

Herein, the external electronic apparatus may include another terminal and server.

Meanwhile, the AI device 20 illustrated in FIG. 2 has been functionally divided into the AI processor 21, the memory 25, the communication unit 27, and the like, but the components described above may be integrated into one module and may be referred to as an AI module.

Memorizing words is one of the most difficult parts for a user in learning a second foreign language. The present specification proposes a deep learning-based recommendation system that allows a user to learn words more conveniently.

Figure 3:
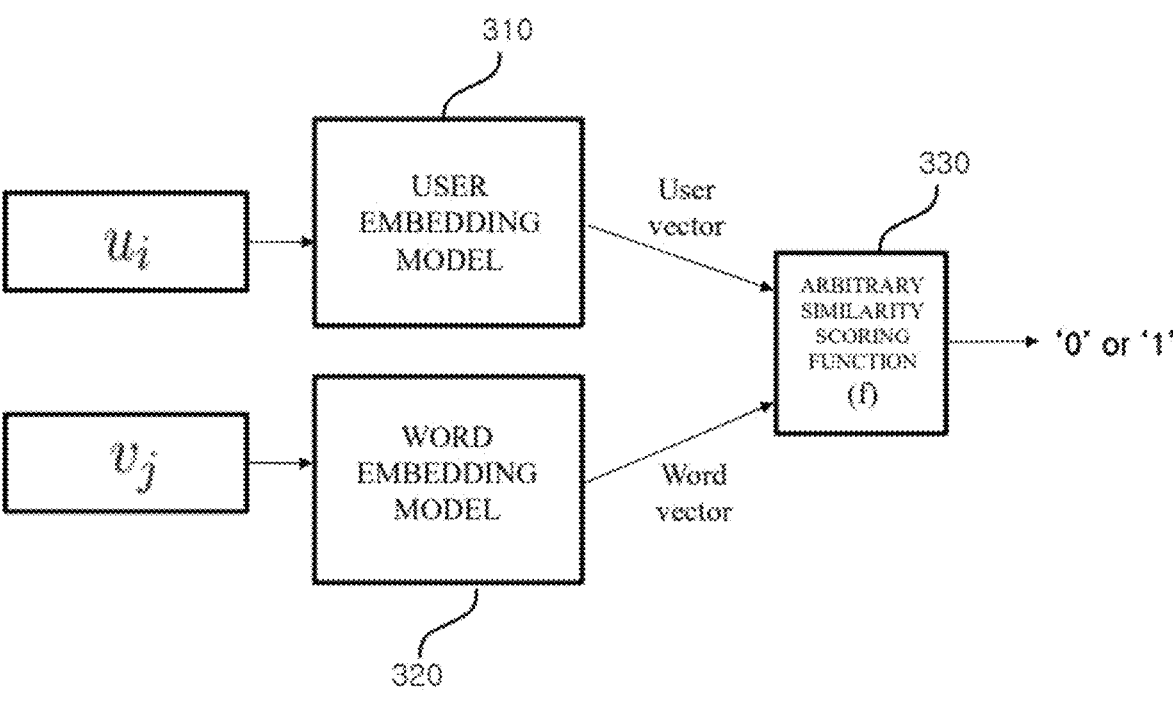
FIG. 3 is a diagram illustrating an example of a word recommendation algorithm according to the present specification.

FIG. 3 is a diagram illustrating an example of a word recommendation algorithm according to the present specification.

Referring to FIG. 3, for example, a server may collect data from an intelligent tutoring system (ITS) provided in real time to 10,000 or more English L2 learners preparing TOEIC. More specifically, a user of a web and/or mobile app provided by the intelligent tutoring system may study TOEIC reading and/or listening questions. For each question answered, the user may review the entire passage (or script of listening question), mark unknown words, and add them to a vocabulary list.

In this case, the server may assume that the words added to the vocabulary list by the user are the words unknown to the user, and train the mounted AI model by using data of words which the user does not know for each user.

The following Table 1 is an example of AI model training data according to the present specification.

TABLE 1

| Index | User_id | Word | Marked |
|---|---|---|---|
| 1 | 1 | Throne | 1 |
| 2 | 1 | Abdicate | 1 |
| 3 | 1 | Monarch | 0 |
| 4 | 2 | Entrepreneur | 1 |
| 5 | 3 | kingdom | 0 |
| . . . | . . . | . . . | . . . |

Referring to Table 1, a server may train an AI model by using information of words added to a vocabulary list by a user for each user. For example, the server may generate training data in which words the user knows or words the user does not know are marked (e.g., '1' is an unknown word, '0' is a known word), and the AI model may learn known words and unknown words for each user by using the generated training data.

The AI model may include a collaborative filtering model for predicting words which the user does not know. For example, the user may input user $u_i$(e.g., user's ID and user's history information (e.g., whether a user added a word to a vocabulary list and information that the user succeeded in knowing a word included in the vocabulary list)), word $v_j$(e.g., word information), and label $y_{ij}$ related thereto, to the collaborative filtering model. In order to acquire an output predicted value $\hat{y}_{ij}$, a framework of the collaborative filtering model may include a user embedding model 310, a word embedding model (e.g., word2vec) 320, and an arbitrary similarity scoring function (f) 330 using user (U) and word (V) embedding vectors.

Such a user embedding model and word embedding model may be replaced by an AI model (e.g., AI model based on deep learning model).

The following equation 1 is an example of the arbitrary similarity scoring function 330 according to the present specification.

[Equation 1]

$$u=U(u_i)v=V(v_j) \tag{1}$$

$$\hat{y}_{ij}=\sigma(f(u,v)) \tag{2}$$

Referring to Equation 1, herein, "similarity" of the arbitrary similarity scoring function 330 may mean proximity of a user embedding vector and a word embedding vector (u, v) in a user-word joint embedding space. Accordingly, the above-described embedding models (U and V) may be optimized to encode user and word vectors closest to each other. For example, the embedding model may consider a vector similar to a word capable of giving a user the most educational value in consideration of a knowledge status (e.g., word acquisition status) of the user.

Referring to Equation 1 again, U and V are trainable parameters of user and word embedding models, respectively, and a trained word embedding model may be initialized to V.

In addition, σ(·) may be a sigmoid function. A training goal of the collaborative filtering model is to minimize binary cross entropies of $y_{ij}$ and $\hat{y}_{ij}$. In the existing model (e.g., MF, Matrix Factorization), f is a simple dot product operation. Accordingly, (2) of Equation 1 may be σ(u·v). However, in a later model (e.g., NCF, Neural Collaborative Filtering), f may be a multi-layer perceptron network using u and v as input values (concatenation).

Referring to FIG. 3 again, the user embedding model 310 and the word embedding model 320 may generate appropriate user vector and word vector. The generated user vector and the word vector may be input to the function f capable of predicting whether a user i knows a word j. For example, when it is predicted that the user i knows the word j, the function f may output a value of 0, and when it is predicted that the user i does not know the word j, the function f may output a value of 1.

The above-described operation of the server may be performed in a user terminal through a separate application installed in the user terminal.

Through this, the method proposed in the present specification may dramatically increase both of efficiency and effectiveness of word memorization, and the server may increase accuracy of a word recommended to a user by using the trained AI model through knowledge tracking of the user.

Figure 4:
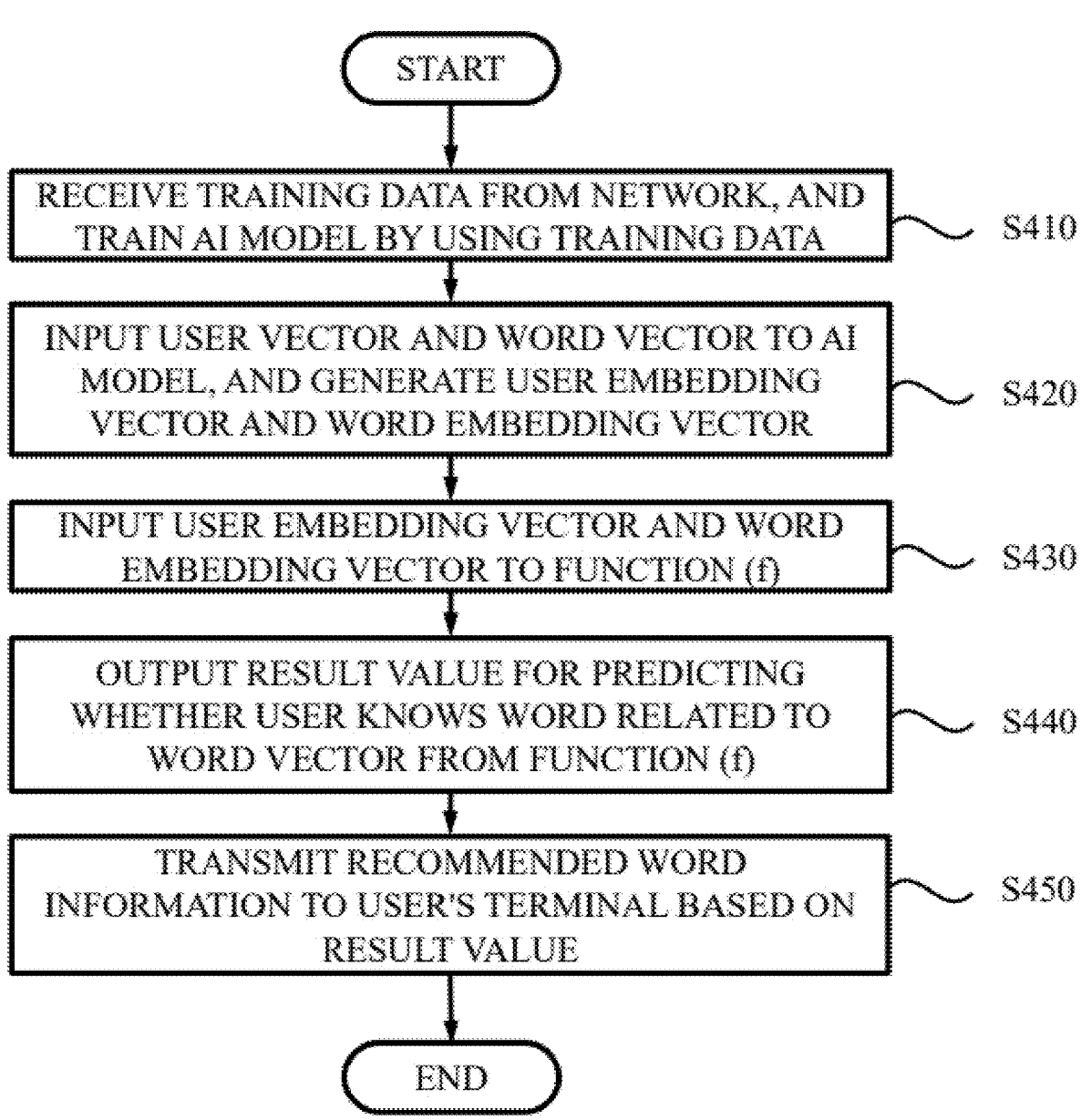
FIG. 4 is a diagram illustrating an embodiment of the present specification.

FIG. 4 is a diagram illustrating an embodiment according to the present specification.

Referring to FIG. 4, a server receives training data from a network, and trains an AI model by using the training data (S410). For example, the network may include the above-described ITS, and the training data may include information of words added to a vocabulary list for learning by one or more users. More specifically, the training data may include data about an index, a user identifier, a word, and marking. The AI model may learn data of words which users do not know for each user.

On the basis of the trained AI model, the server inputs (1) a user vector and (2) a word vector to the AI model, and generates (1) a user embedding vector and (2) a word embedding vector for determining whether the user knows a word related to the word vector (S420). For example, the AI model may include (1) a user embedding model for generating a user embedding vector and (2) a word embedding model for generating a word embedding vector. In addition, the server may optimize (1) the user embedding model and (2) the word embedding model to encode (1) the user vector and (2) the word vector closest to each other.

The server inputs (1) the user embedding vector and (2) the word embedding vector to a function for determining whether the user knows a word related to the word vector (S430). For example, a function f may output the result value on the basis of proximity of (1) the user embedding vector and (2) the word embedding vector, and may output the result value on the basis of Equation 1 described above.

The server outputs a result value for predicting whether the user knows a word related to the word vector from the function (S440). For example, the AI model may include a user embedding model and a word embedding model. More specifically, a new user vector may be input to a user embedding model, and the user embedding model may output a user embedding vector to be input to the arbitrary similarity scoring function. In addition, a word vector may be input to a word embedding model, and the word embedding model may output a word embedding vector to be input to the arbitrary similarity scoring function.

For example, when the new user knows the word, the arbitrary similarity scoring function outputs '0', and when the new user does not know the word, the arbitrary similarity scoring function outputs '1', thereby determining whether the new user knows the word.

The server may transmit recommended word information to a user terminal on the basis of a result value (S450). For example, the recommended word information may include a word predicted as a word which a user does not know.

Figure 5:
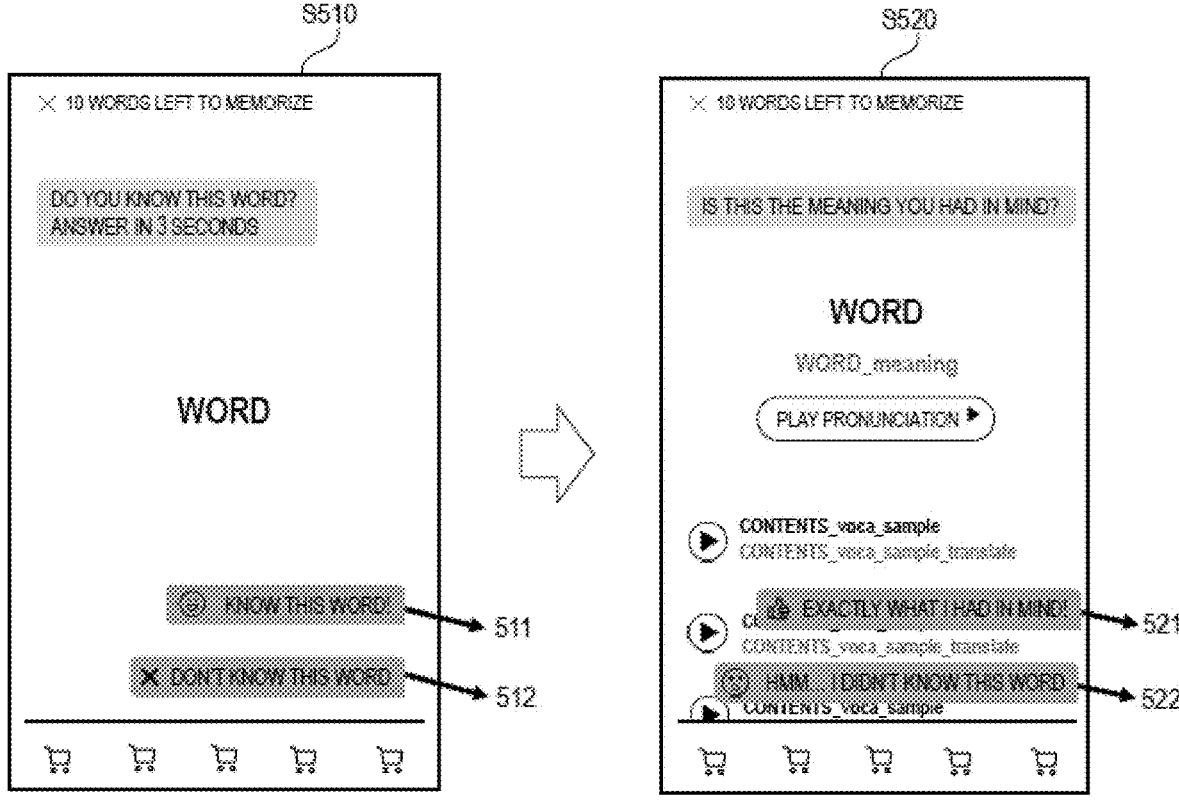
FIG. 5 is a diagram illustrating an example illustrating operation of adding a word to a vocabulary list according to the present specification.

FIG. 5 is a diagram illustrating an example of operation of adding a word to a vocabulary list according to the preset specification.

Referring to FIG. 5 and Table 1, a terminal may generate training data through input of a user. For example, a user may study TOEIC reading and/or listening questions through a web and/or mobile app provided by an ITS. The user may mark an unknown word and add the word to a vocabulary list, and the user may learn the word through the vocabulary list.

The terminal may display the word of the vocabulary list to the user through the display unit (S510). In addition, the terminal may display a first button 511 and a second button 512 capable of receiving an input whether the user knows a word. When the user does not know the word, the user may input a second input value through the second button 512. In this case, the terminal recognizes that the user does not know and marks '1'. If the user knows the word, the user may input a first input value through the first button 511. In this case, the terminal recognizes that the user knows the word and marks '0'.

When the user inputs the first input value through the first button 511, the terminal may display the meaning of the word to the user through the display unit (S520). In addition, the terminal may display a third button 521 and a fourth button 522 for the user to check whether the user accurately knows the word. When the user checks the meaning of the word and knows the word, the user may input a third input value through the third button 521. For example, when the third input value is input, the marking '0' of the word may be maintained. When the user checks the meaning of the word and does not know the word, the user may input a fourth input value through the fourth button 522. For example, when the fourth input value is input, the marking of the word may be changed to '1'.

Figure 6:
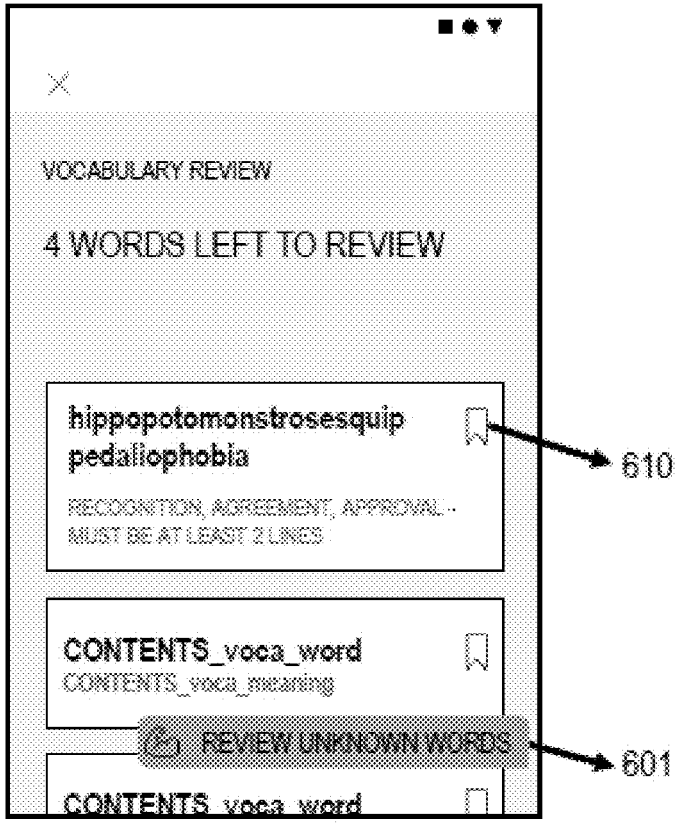
FIG. 6 is a diagram illustrating an example illustrating a word review method according to the present specification.

FIG. 6 is a diagram illustrating an example of a word review method according to the present specification.

Referring to FIG. 6, the user may select reviewing the word after the procedure illustrated in FIG. 5 ends, or separately. The terminal may display information of the words included in the vocabulary list by the user. The terminal may display each word and meaning of the word on a separate window, and each window may include an input button 610 capable of indicating that the word is an important word. For example, the terminal may display only the word indicated as the important word. In addition, the terminal may display a run button 601 for performing word review to the user. When the user commands performance of a word review procedure through the run button 601, the terminal may perform the same or similar procedure as FIG. 5 described above.

Figure 7:
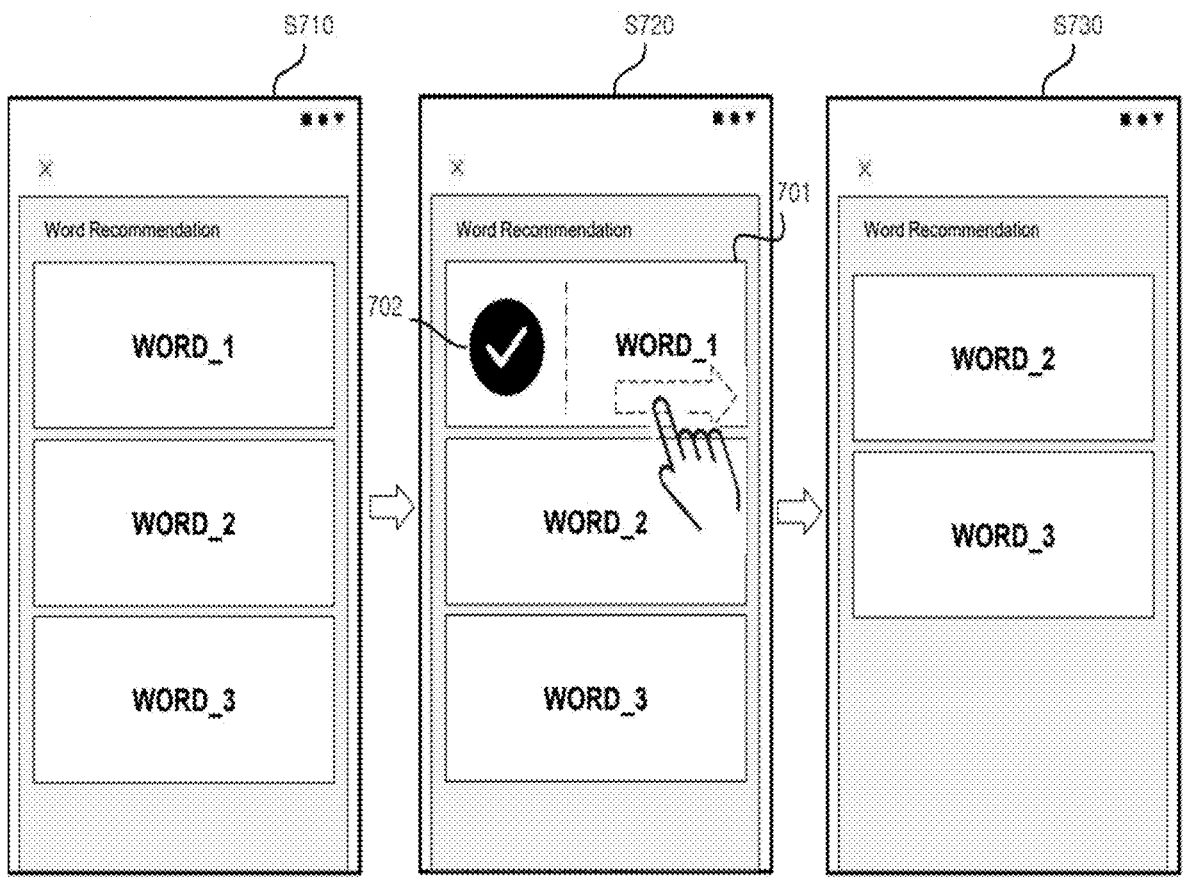
FIG. 7 and FIG. 8 are diagrams illustrating examples of a method in which a terminal recommends a word according to the present specification.
Figure 8:
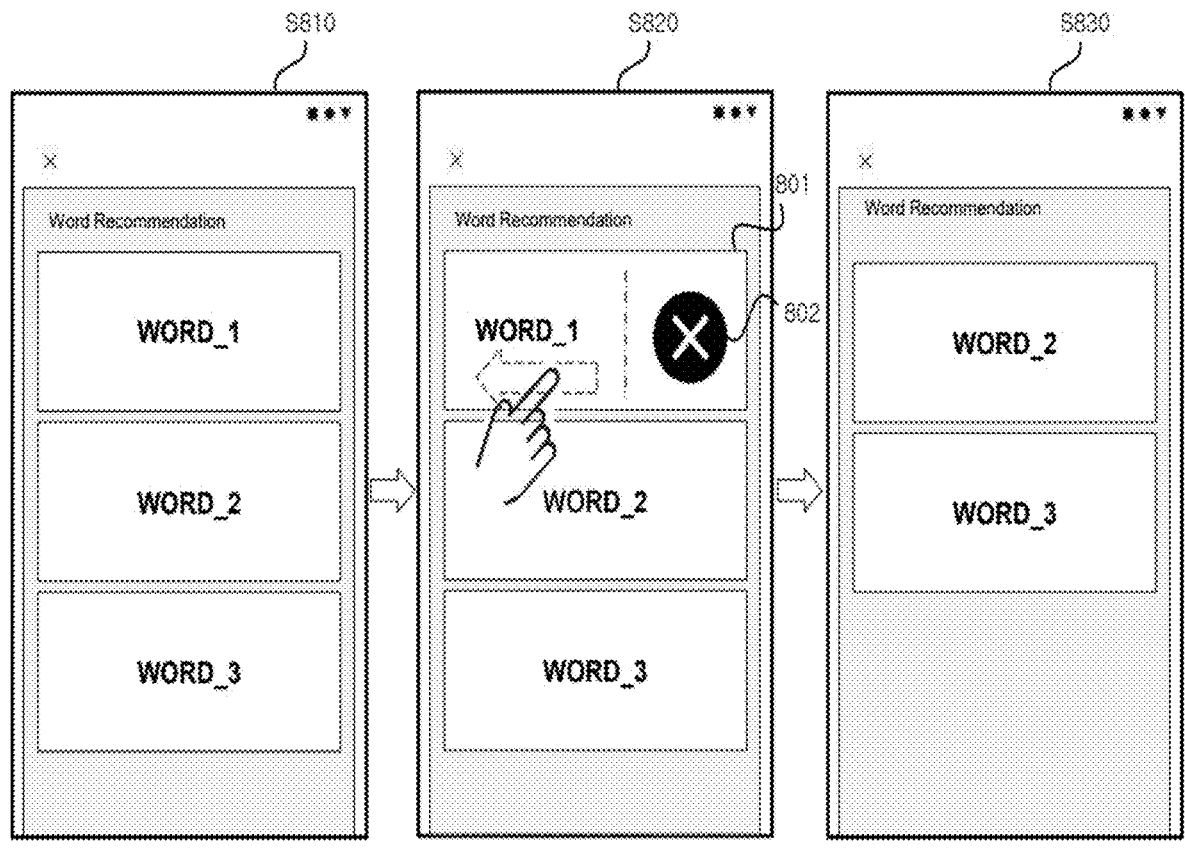

FIG. 7 and FIG. 8 are examples of a method in which a terminal recommends a word according to the present specification.

Referring to FIG. 7 and FIG. 8, the terminal may receive recommended word information from a server and may display a recommended word to a user on the basis of the recommended word information (S710, S810). Each recommended word may be displayed on a separate window.

Referring to FIG. 7, the user may add the recommended word in a vocabulary list (S720). For example, in order to add a recommended word to a vocabulary list, the user may drag a window 701 including the recommended word to the right (or left). More specifically, the window 701 may include an icon 702 representing that the recommended word is to be added to the vocabulary list. In addition, in response to the drag operation, the recommended word information moves in the drag direction together, and the icon 702 may appear. In case of dragging over a specific range of the window 701 (e.g., 50% of the window 701), only the icon 702 may be displayed on the window 701, and the recommended word may be included in the vocabulary list.

In order to present that the operation for adding the recommended word is completed, the terminal does not display the window 701 but may position the window of the next recommended word upwards (S703).

Referring to FIG. 8, in response to the operation illustrated in FIG. 7, the user may perform operation of not including the recommended word in the vocabulary list (S820). The window 801 including the recommended word may include an icon 802 representing that the recommended word is not included in the vocabulary list. When the user drags the window 801 in a direction (e.g., left or right) opposite to the drag direction illustrated in FIG. 7 and the dragging is over a specific range of the window 801, only the icon 802 may be displayed on the window 801 and the recommended word may not be included in the vocabulary list.

In order to present that the operation for not adding the recommended word to the vocabulary list is completed, the terminal does not display the window 801 and may position the window of the next recommended word upwards (S830).

The terminal may generate and transmit training data to the server depending on whether the recommended word is included or not included in the vocabulary list.

Figure 9:
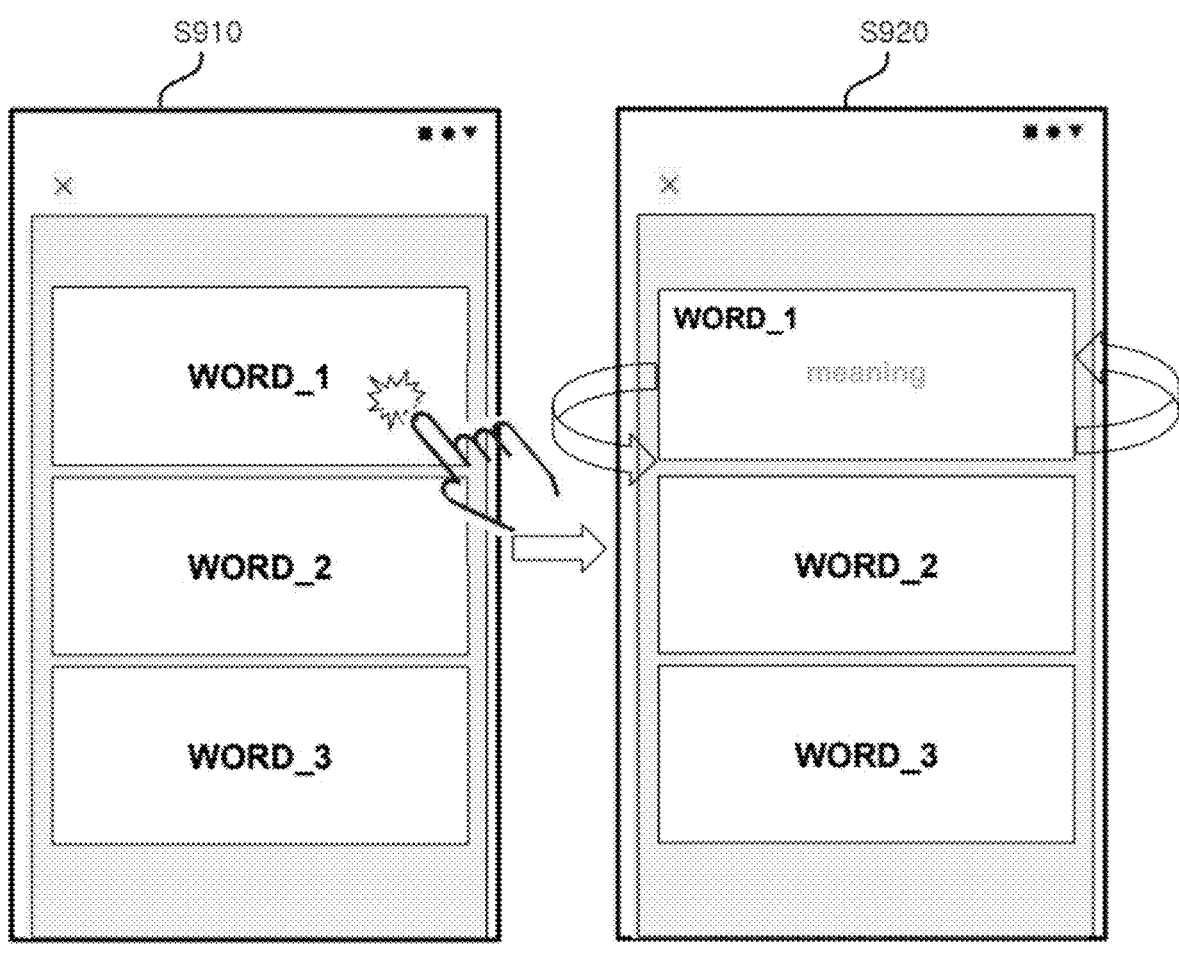
FIG. 9 is a diagram illustrating an example of a word learning method according to the present specification.

FIG. 9 is a diagram illustrating an example of a word learning method according to the present specification.

Referring to FIG. 9, for example, the terminal may display windows representing the words included in the vocabulary list to the user through the display unit to perform the word review procedure, and the user may touch the window (S910). For example, the user may guess the meaning of the word and may touch a specific point of the window to check the guessed meaning.

When the user touches the window of the terminal, the terminal may rotate the touched window to display the meaning of the word (S920). For example, the operation for rotating the window may be operated in response to the input touch. More specifically, when the user touches the right side of the window, the terminal may rotate the window to the right by 180 degrees to display motion of displaying the backside of the window, and the meaning information of the word may be displayed on the backside of the window.

Figure 10:
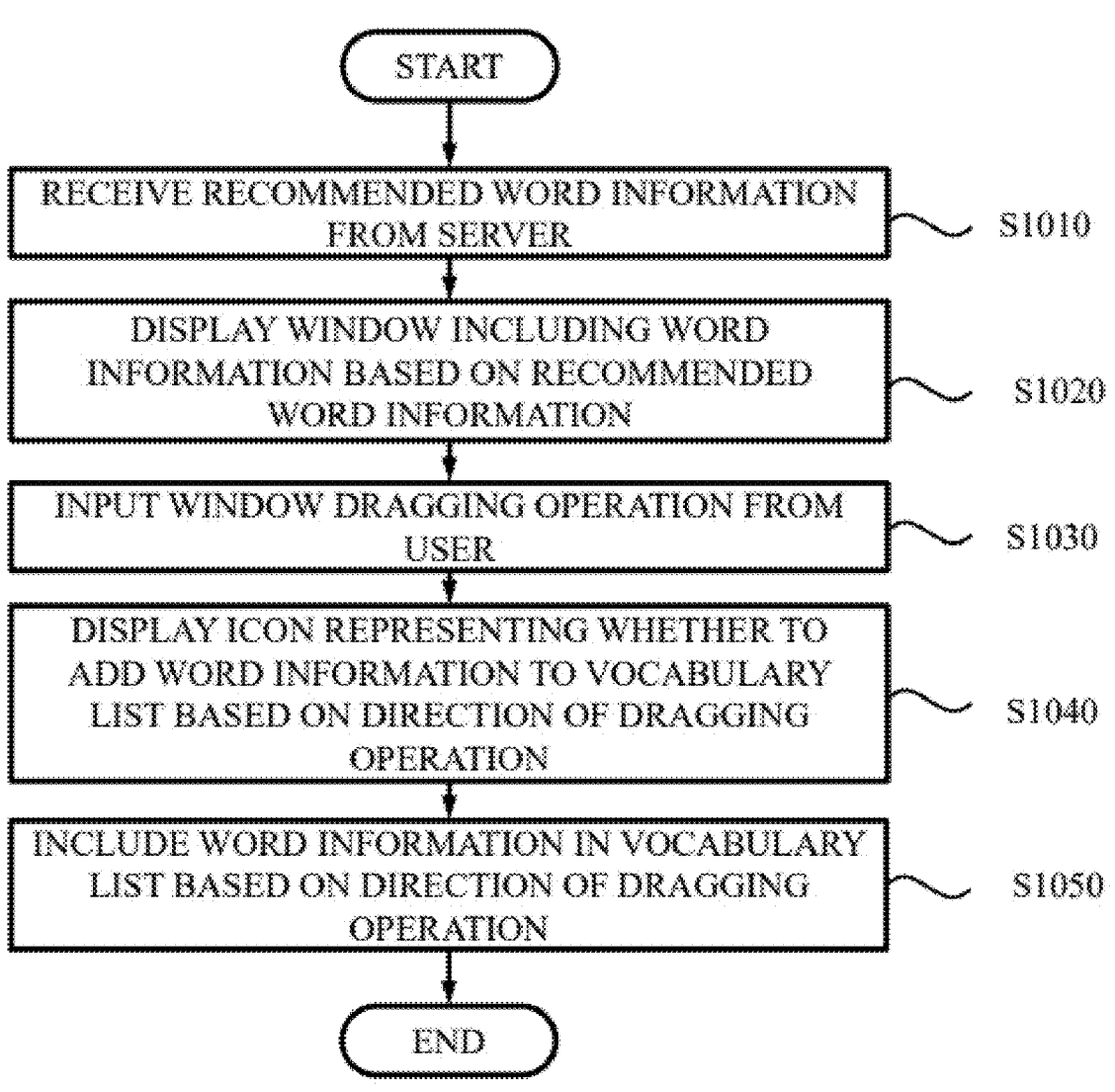
FIG. 10 is a diagram illustrating an embodiment of a terminal according to the present specification.

FIG. 10 is a diagram illustrating an embodiment according to the present specification.

Referring to FIG. 10, the terminal may be connected to a network and/or a server and may transmit and receive data for word learning. The operation illustrated in FIG. may be performed in conjunction with or separately from the server operation illustrated in FIG. 4.

The terminal receives recommended word information from the server (S1010). For example, the recommended word information may include word information predicted to be unknown to the user generated in the AI model of the server trained by the trained data of the existing users. More specifically, the AI model may include the above-described configuration illustrated in FIG. 3. In addition, the recommended word information may be generated in the server through the same or similar operation as the operation illustrated in FIG. 4.

The terminal displays a window including the word information on the basis of the recommended word information (S1020).

The terminal receives operation of dragging the window including the word information from a user (S1030).

The terminal displays an icon representing whether to add the word information to the vocabulary list of the terminal on the basis of the direction of the dragging operation of the user (S1040). For example, the icon may include a first icon representing that the word information is added to the vocabulary list and a second icon representing that the word information is not added to the vocabulary list. More specifically, in response to the dragging operation of the user in the direction of the dragging operation, the word information may move first and then the icon may move in accordance with the movement of the word information.

The terminal includes the word information in the vocabulary list on the basis of the direction of the dragging operation (S1050). For example, when the direction of the dragging operation is the right, the word information may be included in the vocabulary list. When the direction of the dragging operation is the left, the word information may not be included in the vocabulary list. In addition, the terminal may update the training data by using the word information included in the vocabulary list, and may transmit the training data to the server to train the AI model. In addition, the terminal may display a window including the word information of the vocabulary list to provide card-type word learning to the user, and the user may guess the word meaning of the word information and touch the window including the word information of the vocabulary list to check the meaning. The terminal may rotate and display the window including the word information in a corresponding direction in accordance with a point of receiving the touch operation from the user. For example, the user may touch a card with the word information on the front and the meaning of the word information on the back to check the meaning of the word through the card rotating operation, thereby performing the card-type word learning through the terminal.

Through this, the user may more efficiently study and memorize the word through the user interface of the terminal. In addition, the terminal may continuously train the AI model of the server by collecting data about word selection of the user through the user interface.

The above-described present specification may be implemented as a computer-readable code on a program-recorded medium. The computer-readable medium includes all kinds of recording devices which store data readable by a computer system. Examples of the computer-readable medium are an HDD (Hard Disk Drive), an SSD (Solid State Disk), an SDD (Silicon Disk Drive), a ROM, a RAM, a CD-ROM, a magnetic tape, a floppy disk, an optical data storage device, and the like, and also include that implemented in a form of carrier wave (e.g., transmission through internet). Accordingly, the above detailed description should not be construed as restrictive in all respects and should be considered as exemplary. The scope of the present specification should be determined by a reasonable interpretation of the appended claims, and all modifications within the equivalent scope of the present specification are included in the scope of the present specification.

In addition, although the above description has been focused on services and embodiments, this is merely an example and does not limit the present specification, and those of ordinary skill in the art can know that various modifications and application not exemplified in the above description are possible in the scope not depart from the essential characteristics of the present service and embodiments. For example, each component specifically represented in the embodiments may be modified and implemented. In addition, differences related to such modifications and applications should be construed as being included in the scope of the present specification defined in the appended claims.

According to the embodiment of the present specification, it is possible to increase efficiency and effectiveness of word memorization of foreign language learners.

In addition, according to the embodiment of the present specification, it is possible to recommend an accurate word to foreign language learners by a trained AI model through knowledge tracking of foreign language learners.

In addition, according to the embodiment of the present specification, a user can efficiently study and memorize a word through the user interface.

In addition, according to the embodiment of the present specification, it is possible to train the AI model by collecting data about word selection of a user.

The effects obtainable in the present specification are not limited to the above-mentioned effects, and other effects not mentioned will be clearly understood by those of ordinary skill in the art to which the present specification belongs from the description below.

What is claimed is:

1. A word recommendation method performed by a terminal, the method comprising:

receiving recommended word information from a server, wherein the recommended word information includes word information that a user is predicted not to know in an AI (Artificial Intelligence) model of the user based on training data of the user;

displaying a first window including the word information based on the recommended word information;

receiving operation of dragging the first window from the user;

displaying an icon representing whether to add the word information to a vocabulary list of the terminal based on a direction of the dragging operation; and including the word information in the vocabulary list based on the direction of the dragging operation, wherein the AI model includes (1) a user embedding model for generating an embedding vector of the user, (2) a word embedding model for generating an embedding vector of a word related to the word information, and (3) an arbitrary similarity scoring function of determining similarity between the user embedding vector acquired from the user embedding model and the word embedding vector acquired from the word embedding model, wherein the server inputs (1) the user embedding vector and (2) the word embedding vector to the arbitrary similarity scoring function and outputs a result value for predicting whether the user knows a word related to the word vector from the arbitrary similarity scoring function, wherein the recommended word information is generated in the server based on the result value, and wherein the method further comprises:

displaying a word, a first button and a second button on the terminal, based on the first button being selected by the user, marking the word displayed on the terminal as "0" indicating that the user knows the word displayed on the terminal, based on the second button being selected by the user, marking the word displayed on the terminal as "1" indicating that the user does not know the word displayed on the terminal, based on the word displayed on the terminal being marked as "0", displaying meaning of the word displayed on the terminal, a third button and a fourth button on the terminal, based on the third button being selected by the user, maintaining a marking "0" indicating that the user knows the word displayed on the terminal, and based on the fourth button being selected by the user, changing the marking "0" to "1" indicating that the user does not know the word displayed on the terminal.

2. The word recommendation method according to claim 1, further comprising updating the training data based on the vocabulary list and transmitting the training data to the server.

3. The word recommendation method according to claim 1, wherein the word information is included in the vocabulary list when the direction of the dragging operation is a first direction, and the word information is not included in the vocabulary list when the direction of the dragging operation is a direction opposite to the first direction.

4. The word recommendation method according to claim 3, wherein in the displaying the icon, the word information is moved in the direction of the dragging operation in response to the dragging operation, and movement of the icon is displayed in accordance with the word information.

5. The word recommendation method according to claim 1, further comprising:

displaying a second window including the word information of the vocabulary list based on the vocabulary list; and receiving touch operation of the second window for checking meaning of the word related to the word information based on the word information from the user.

6. The word recommendation method according to claim 5, further comprising displaying a third window for presenting meaning of the word information of the vocabulary list based on a point of receiving the touch operation.

7. The word recommendation method according to claim 6, wherein the displaying the third window is to rotate and display the second window in a direction corresponding to the point of receiving the touch operation.

8. A terminal which performs a word recommendation method, the terminal comprising:

a communication module;

a memory;

a display unit; and a processor, wherein the processor receives recommended word information from a server through the communication module, the recommended word information includes word information that a user is predicted not to know in an AI (Artificial Intelligence) model based on training data of the user, and the processor allows the display unit to display a first window including the word information based on the recommended word information, to receive operation of dragging the first window from the user, and to display an icon representing whether to add the word information to a vocabulary list included in the memory based on a direction of the dragging operation, and includes the word information in the vocabulary list based on the direction of the dragging operation, wherein the AI model includes (1) a user embedding model for generating an embedding vector of the user, (2) a word embedding model for generating an embedding vector of a word related to the word information, and (3) an arbitrary similarity scoring function of determining similarity between the user embedding vector acquired from the user embedding model and the word embedding vector acquired from the word embedding model, wherein the server inputs (1) the user embedding vector and (2) the word embedding vector to the arbitrary similarity scoring function, outputs a result value for predicting whether the user knows a word related to the word vector from the arbitrary similarity scoring function, wherein the recommended word information is generated in the server based on the result value, and wherein the processor:

displays a word, a first button and a second button on the terminal, based on the first button being selected by the user, marking the word displayed on the terminal as "0" indicating that the user knows the word displayed on the terminal, based on the second button being selected by the user, marks the word displayed on the terminal as "1" indicating that the user does not know the word displayed on the terminal, based on the word displayed on the terminal being marked as "0", displays meaning of the word displayed on the terminal, a third button and a fourth button on the terminal, based on the third button being selected by the user, maintains a marking "0" indicating that the user knows the word displayed on the terminal, and based on the fourth button being selected by the user, changes the marking "0" to "1" indicating that the user does not know the word displayed on the terminal.

9. The terminal according to claim 8, wherein the processor updates the training data based on the vocabulary list, and transmits the training data to the server through the communication module.

10. The terminal according to claim 8, wherein the processor allows the display unit to display a second window including the word information of the vocabulary list based on the vocabulary list, and to receive touch operation of the second window for checking meaning of the word related to the word information based on the word information from the user.

11. The terminal according to claim 10, wherein the processor allows the display unit to display a third window for presenting meaning of the word information of the vocabulary list based on a point of receiving the touch operation.

12. The word recommendation method according to claim 1, wherein the result value is 0 when the user related to the user embedding vector is predicted to know the word related to the word embedding vector, and the result value is 1 when the user related to the user embedding vector is predicted not to know the word related to the word embedding vector.

\* \* \* \* \*